United States Patent
Visca et al.

(10) Patent No.: US 6,821,454 B2
(45) Date of Patent: Nov. 23, 2004

(54) METHOD FOR REMOVING WATER FROM SURFACES

(75) Inventors: Mario Visca, Alessandria (IT); Simonetta Fontana, Milan (IT)

(73) Assignee: Ausimont S.p.A., Milan (IT)

(*) Notice: Subject to any disclaimer, the term of this patent is extended or adjusted under 35 U.S.C. 154(b) by 0 days.

(21) Appl. No.: 09/995,673

(22) Filed: Nov. 29, 2001

(65) Prior Publication Data

US 2002/0066205 A1 Jun. 6, 2002

(30) Foreign Application Priority Data

Dec. 5, 2000 (IT) ..................................... MI2000A2625

(51) Int. Cl.$^7$ ................................................. C09K 3/00
(52) U.S. Cl. ............................. 252/194; 134/2; 134/42
(58) Field of Search ............................. 252/194; 134/2, 134/42

(56) References Cited

U.S. PATENT DOCUMENTS

| | | |
|---|---|---|
| 3,242,218 A | 3/1966 | Miller |
| 3,665,041 A | 5/1972 | Sianesi et al. |
| 3,715,378 A | 2/1973 | Sianesi et al. |
| 3,810,874 A | 5/1974 | Mitsch et al. |
| 4,523,039 A | 6/1985 | Lagow et al. |
| 5,144,092 A | 9/1992 | Marraccini et al. |
| 5,980,642 A | * 11/1999 | Strepparola et al. ........... 134/2 |
| 6,096,240 A | * 8/2000 | Strepparola et al. .......... 134/42 |

FOREIGN PATENT DOCUMENTS

| | | |
|---|---|---|
| EP | 0 148 482 A2 | 7/1985 |
| EP | 0 826714 A2 | 3/1998 |
| EP | 0 826 714 A2 | 3/1998 |
| GB | 1104482 | 2/1968 |

* cited by examiner

*Primary Examiner*—Cephia D. Toomer
(74) *Attorney, Agent, or Firm*—Arent Fox PLLC

(57) ABSTRACT

Method for removing water from surfaces of various materials, comprising the steps of covering said surface with a composition having specific weight higher than that of water and subsequently removing water from the composition by skimming, wherein a composition essentially consisting of the following components is used:

a fluorinated non ionic additive component A) of formula:

$$T\text{-}OR_f(CFY)\text{-}L \qquad (I)$$

a (per)fluoropolyether component B),
wherein the ratio by weight (K) between the (per)fluorinated part and the hydrogenated L part of the additive is in the range 1.50–4.00 and the ratio $K^I$ between the number average molecular weight of the fluoropolyether part T-$OR_f$— of the additive and the number average molecular weight of the component B) is higher than 1.60.

13 Claims, No Drawings

METHOD FOR REMOVING WATER FROM SURFACES

The present invention relates to a method for the substantially complete removal of water from surfaces of various articles. The problem of the water removal from manufactured articles is particularly felt in the field of electronics, fine mechanics and finishing of precious metals.

From patent application EP 826,714 in the name of the Applicant compositions are known formed by a (per)fluoropolyether having number average molecular weight in the range 300–1,500 and by a fluorinated non ionic additive which can have both end groups of oxyethylene type or one end group of oxyethylene type and the other of fluorinated or perfluorinated type; in the additive structure the ratio by weight (K) between (per)fluorinated part and hydrogenated part being in the range 1.50–3.50. In the examples an additive is used having a perfluorinated end group and as perfluoropolyether solvent a compound of formula:

$$CF_3O(C_3F_6O)_{1.7}(CF_2O)_{0.1}CF_3$$

having molecular weight of about 450. The results obtained in the Examples are extremely good and effective in the removal of water from surfaces of various articles. However the additives having perfluorinated end groups are obtained by a particularly expensive process.

The need was felt to have available additives having a fluorinated end group able to give the same removal efficiency of additive with perfluorinated end group. In fact the additives having fluorinated end groups can be produced with an industrial process having higher yields and therefore more advantageous from an industrial point of view. The Applicant has verified that repeating the Examples of said patent application with additives having a fluorinated instead of a perfluorinated end group, the water is removed from the substratum in a less effective extent than using the same additive having the perfluorinated end group. See the comparative Examples.

There was therefore the need to find compositions, containing a perfluoropolyether solvent and an additive with a fluorinated end group, to make possible the water removal from the substratum in a likewise effective way than using the additive with the perfuorinated end group.

An object of the present invention is a method for removing water from surfaces of various articles, comprising the steps of covering said surface with a composition having a specific weight higher than that of the water and subsequently removing water from the composition by skimming, wherein a composition consisting essentially of the following components is used:

A) a non ionic additive having a fluoropolyether structure with a fluorinated T end group containing one chlorine atom, having the following formula:

   (I)

wherein

   (Ia)

wherein:

$X=CH_2O$; $CH_2NR''$; $CONR''$; $CH_2OCH_2CH_2NR''$; $CH_2OCOCH_2O$;

$B=OH$; $SH$; $NHR''$; $OCH_3$; $OCOCH_3$, with $R''=H$; $C_{1-3}$ alkyl,

T is a fluorinated radical selected from $ClCF_2CF(CF_3)$—, $CF_3CFClCF_2$—, $ClCF_2CF_2$—, $ClCF_2$—, $Y=CF_3$ or F, the radical $R_f$ being of (per)fluoropolyether type;

being in said additive of formula (I):

the number average molecular weight of the fluoroether part T-OR$_f$— in the range 400–2,000, the ratio by weight (K) between the fluorinated part and the hydrogenated L part of the additive is in the range 1.50–4.00; the n parameter in formula (Ia) being such as to meet said ratio;

B) a perfluoropolyether having number average molecular weight in the range 300–900, the ratio $K^I$ between the number average molecular weight of the fluoropolyether part T-OR$_f$— of the additive and the number average molecular weight of component B) being higher than 1.60.

The number average molecular weight of the fluoroether part T-OR$_f$— of the compounds of formula (I) component A) is preferably in the range 500–1,200, still more preferably in the range 600–1,000.

The perfluoropolyether component B) has number average molecular weight preferably in the range 300–650.

The radical $R_f$ of (per)fluoropolyether type preferably comprises repeating units statistically distributed along the polymer chain selected from: $(CF_2CF_2O)$, $(CFYO)$ wherein Y is equal to F or $CF_3$, $(C_3F_6O)$; $(CF_2(CF_2)_zO)$ wherein z is an integer equal to 2 or 3; $(CF_2CF(OR_f)O)$, $(CF(OR_f)O)$ wherein $R_f$, is equal to —$CF_3$, —$C_2F_5$ —$C_3F_7$; $CR_4R_5CF_2CF_2O$ wherein $R_4$ and $R_5$ are equal to or different from each other and selected between Cl or perfluoroalkyl, for example having 1–4 carbon atoms.

If the ratio $K^I$ is lower than or equal to 1.60 (see the comparative Examples) the composition containing the additive does not result effective in the substantially complete removal of water. This was not inferable from EP 826,714; in fact in the Examples of this patent application the ratio $K^I$ calculated between the molecular weight of the fluorinated part of the additive and the molecular weight of component B) is 1,46 and therefore lower than the limit that the Applicant has unexpectedly found for the use according to the method of the present invention of the additives component A) having a fluorinated end group containing one chlorine atom.

To obtain a composition to be used in the method according to the present invention it is further necessary that the ratio K between the fluorinated part and the hydrogenated part of the additive lies within the above limits.

When the ratio K is outside the above limits the additive is not effective in the substantial removal of water from the substratum.

The following (per)fluoropolyether $R_f$ which comprise the following repeating units can in particular be mentioned as the preferred ones:

(a) —$(CF_2CF(CF_3)O)_a(CFYO)_b$— wherein Y is F or $CF_3$; a and b are integers such that the molecular weight is in the above range; a/b is in the range 10–100;

(b) —$(CF_2CF_2O)_c(CF_2O)_d(CF_2(CF_2)_zO)_h$— wherein c, d and h are integers such that the molecular weight is within the above range; c/d is in the range 0.1–10; h/(c+d) is in the range 0–0.05, z has the above value, h can be equal to 0;

(c) —$(CF_2CF(CF_3)O)_e(CF_2CF_2O)_f(CFYO)_g$— wherein Y is F or $CF_3$; e, f, g are integers such that the molecular weight is within the above range; e/(f+g) is in the range 0.1–10, f/g is in the range 2–10;

(d) —$(CF_2O)_j(CF_2CF(OR_{f''})O)_k(CF(OR_{f''})O)_l$— wherein: $R_{f''}$ is —$CF_3$, —$C_2F_5$, —$C_3F_7$; j,k,l are integers such that the molecular weight is within the above range; k+l and j+k+l are at least equal to 2, k/(j+l) is in the range 0.01–1,000, l/j is in the range 0.01 and 100;

(e) —$(CF_2(CF_2)_zO)_s$— wherein s is an integer such as to give the above molecular weight, z has the already defined meaning;

(f) —$(CR_4R_5CF_2CF_2O)_{j'}$— wherein $R_4$ and $R_5$ are equal to or different from each other and selected from H, Cl or perfluoroalkyl, for example having 1–4 carbon atoms, j' being an integer such that the molecular weight is the above mentioned one;

(g) —$(CF(CF_3)CF_2O)_{j''}$— j' being an integer such to give the above molecular weight.

These structures comprising the mentioned repeating units and the methods for their preparation are described in patent GB 1,104,482, in U.S. Pat. No. 3,242,218, U.S. Pat. No. 3,665,041, U.S. Pat. No. 3,715,378, U.S. Pat. No. 3,665,041, EP 148,482, U.S. Pat. No. 4,523,039, U.S. Pat. No. 5,144,092, and for the functional derivatives see U.S. Pat. No. 3,810,874. All these patents are herein incorporated by reference.

The value $K^I$ is preferably higher than 2.00 and still more preferably in the range 2.00–3.00.

The perfluoropolyether component B) preferably has the following structure:

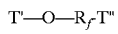

T'—O—$R_f$T"

wherein:

$R_f$ has the above meaning;
T' and T", equal or different, are selected from —$CF_3$, —$C_2F_5$, —$C_3F_7$.

Particularly preferred structures are the following:

T'O$(C_3F_6O)_{a''}$(CFYO)$_{b''}$T"    (III)

wherein Y=F or $CF_3$, a" and b" are integers such that the molecular weight is within the indicated range with a"/b" in the range 1–40; T' and T" are as above defined.

T'O$(C_2F_4O)_p(CF_2O)_q$T"    (IV)

wherein p and q are integers such that the molecular weight is within the indicated range with p/q in the range 0.6–1.2; T' and T" are as above.

T'O$(C_3F_6O)_{s'}$T"    (V)

wherein s' is an integer such that the molecular weight is within the indicated range; T' and T" are as above.

The extreme effectiveness of the compositions of the invention containing the perfluoropolyether component B) and the fluorinated non ionic additive component A) allows to use reduced amounts of additive, generally lower than or equal to 0.1% by weight, preferably lower than 0.05% with respect to the total weight of the composition.

The additives A) of the present invention and the compositions containing the additives A) and the component B) are new products and allow to obtain the above results when they are used in the removal of water from the substratum. They allow to obtain the unexpected result to have a complete or substantially complete removal of water from the substratum. The compositions of the invention are easily removable from the substratum without leaving any residue using the conventional methods used for substrata (semiconductors).

To prepare the monofunctional additives having a COF end group the above mentioned patents can be used, for example starting from a monofunctional (per) fluoropolyether, i.e. having —COF end groups, following the disclosure of U.S. Pat. No. 3,810,874, herein incorporated by reference.

For example for preparing additives wherein X=$CH_2O$ and B=OH one starts from the product having a —COF end group. The —COF group is reduced by metal hydrides to give the alcoholic derivative —$CH_2OH$, which by reaction with one mole of ethylene oxide gives the monoaddition product —$CH_2O$—$CH_2CH_2OH$. The corresponding tosyl derivative is prepared by reaction with the paratoluensulphonic acid chloride. The tosyl derivative is reacted with a large excess of a polyethylenglycol in the presence of potassium terbutylate. When X takes the other above values, the disclosure of the above U.S. Pat. No. 3,810,874 is followed.

The following Examples have an illustrative and not limitative purpose of the scope of the present invention.

Experimental Part

The used perfluoropolyether solvents B) are commercially available and are different by the number average molecular weight, and consequently they have different boiling point and viscosity.

The water removal has been determined according to the following method:

a distilled water drop (about 0.1 ml) is deposited on a flat surface of a glass crystallizer having a base area of about 10 cm$^2$. Then some ml of the tested solution containing 0.03% by weight of additives are added along the walls until covering the drop and after 30" how the removal of water from the flat crystallizer surface has taken place, is observed. The attributed points correspond to the following cases:

1 Complete removal
2 Drop residue <10%
3 Drop residue >10%
4 No removal

The 1 and 2 values are considered acceptable (substantially complete removal).

EXAMPLE 1

Synthesis of an additive of formula Cl$(C_3F_6O)_{3.7}(C_2F_4O)_{0.37}(CF_2O)_{0.1}CF_2CH_2OCH_2CH_2(CH_2CH_2)_4OH$, preparation of the formulation and respective evaluation by the above described test.

In a jacketed more necked reactor, equipped with thermocouple, mechanicle stirrer condenser, containing 160 g of aqueous NaOH solution at 50% and 95 g (0.5 moles) of paratoluensulphonic acid chloride dissolved in 400 ml of $CH_2Cl_2$, 370 g of Cl$(C_3F_6O)_{3.7}(C_2F_4O)_{0.37}(CF_2O)_{0.1}CF_2CH_2OCH_2CH_2OH$ (0.45 moles) are dropped. The solution is left at room temperature for eight hours under strong stirring and after having added 1 l of water it is left under stirring for further 4 hours.

It is neutralized with hydrochloric acid and the organic phase is separated. After distillation of the solvent 405 g of a limpid liquid corresponding to the tosyl derivative are obtained. The compound is characterized by IR, $^{19}$F NMR and H NMR.

In a jacketed more necked reactor, equipped with thermocouple, mechanical stirrer and condenser, containing 18 g (0.16 moles) of potassium terbutylate and 194 g (1 mole) of tetraethylenglycol, 145 g (0.15 moles) of the above prepared tosyl derivative are dropped at the temperature of 60° C. in 4 hours. Then it is acidified with diluted hydrochloric acid and the organic phase is separated. A second washing is carried out with 200 ml of hydrochloric acid at 5% and the organic phase brought to dryness results to be formed by 131 g of Cl $(C_3F_6O)_{3.7}(C_2F_4O)_{0.37}(CF_2O)_{0.1}CF_2CH_2OCH_2CH_2(OCH_2CH_2)_4OH$ The compound is characterized by IR, $^{19}F$ NMR and H NMR. The calculated value K is 3.

Preparation of the Formulation

A composition is prepared wherein as component B there is the compound $CF_3O(C_3F_6O)_1(CF_2O)_{0.1}CF_3$ having boiling point 55°–60° C. containing 300 ppm of the above prepared additive. The calculated value $K^I$ is 2.3.

The composition is tested according to the above described method and the attributed point is 1 (total removal of water).

EXAMPLE 2

Preparation of a composition as in Example 1 but with the component B) having an higher molecular weight, and evaluation by the above described test.

A composition is prepared formed by $CF_3O(C_3F_6O)_{1.7}(CF_2O)_{0.1}CF_3$ having boiling point 90°–92° C. containing 300 ppm of the additive synthetized in Example 1. The value $K^I$ is 1.7.

The composition is tested according to the above described general method. The attributed point is in this case 2.

EXAMPLE 3 (COMPARATIVE)

Synthesis of the additive of formula $Cl(C_3F_6O)_{1.9}(C_2F_4O)_{0.1}(CF_2O)_{0.1}CF_2CH_2OCH_2CH_2(OCH_2CH_2)_4OH$, preparation of the formulation as in Example 1 and respective evaluation with the above described test In a jacketed more necked reactor, equipped with thermocouple, mechanical stirrer and condenser, containing 160 g of aqueous NaOH solution at 50% and 95 g (0.5 moles) of paratoluensulphonic acid chloride dissolved in 400 ml of $CH_2Cl_2$, 221 g (0.45 moles) of the compound $Cl(C_3F_6O)_{1.9}(C_2F_4O)_{0.1}(CF_2O)_{0.1}CF_2CH_2OCH_2CH_2OH$ are dropped.

The solution is left at room temperature for eight hours under strong stirring; 1 liter of water is added and it is left under stirring for further 4 hours.

It is neutralized with hydrochloric acid and the organic phase is separated. After distillation of the solvent 252 g of a limpid liquid corresponding to the tosyl derivative are obtained. The compound is characterized by IR, $^{19}F$ NMR and H NMR.

In a jacketed more necked reactor, equipped with thermocouple, mechanical stirrer and condenser, containing 18 g (0.16 moles) of potassiumterbutylate and 194 g (1 mole) of tetraethylenglycol, 97 g (0.15 moles) of the above prepared tosyl derivative are dropped at the temperature of 60° C. in 4 hours. Then it is acidified with diluted hydrochloric acid and the organic phase is separated.

A second washing is carried out with 200 ml of hydrochloric acid at 5% and the organic phase, after drying, results to be formed of 91 g of the compound $Cl(C_3F_6O)_{1.9}(C_2F_4O)_{0.1}(CF_2O)_{0.1}CF_2CH_2OCH_2CH_2(OCH_2CH_2)_4OH$ The compound is characterized by IR, $^{19}F$ NMR and H NMR. The value of K is 1.66.

A composition is prepared formed by $CF_3O(C_3F_6O)_1(CF_2O)_{0.1}CF_3$ containing 300 ppm of the above prepared additive. The $K^I$ value is 1.27, therefore lower than the limit of 1.60.

The composition is tested according to the above described method. It is observed that water is not removed (point: 4).

EXAMPLE 4 (COMPARATIVE)

Preparation of a composition containing the additive of Example 3 but with the component B) of Example 2, and evaluation according to the above described method.

A composition is prepared formed by $CF_3O(C_3F_6O)_{1.7}(CF_2O)_{0.1}CF_3$ containing 300 ppm of the additive of Example 3. The value $K^I$ is 0.94.

The composition is unable to remove the water drop. The attributed point is like that of comparative Example 3.

EXAMPLE 5 (COMPARATIVE)

Synthesis of the additive of formula $Cl(C_3F_6O)_{2.8}(C_2F_4O)_{0.25}(CF_2O)_{0.06}CF_2CH_2OCH_2CH_2(OCH_2CH_2)_4OH$, preparation of the corresponding composition with component B) perfluoropolyether used in Example 2 and evaluation of the efficacy of the composition with the above described test.

In a jacketed more necked reactor, equipped with thermocouple, mechanical stirrer and condenser, containing 160 g of aqueous NaOH solution at 50% and 95 g (0.5 moles) of paratoluensulphonic acid chloride dissolved in 400 ml of $CH_2Cl_2$, 295 g of $Cl(C_3F_6O)_{2.8}(C_2F_4O)_{0.25}(CF_2O)_{0.06}CF_2CH_2OCH_2CH_2OH$ (0.45 moles) are dropped. The solution is left at room temperature for eight hours under strong stirring. 1 liter of water is added and it is left under stirring for further 4 hours.

It is neutralized with hydrochloric acid and the organic phase is separated. After distillation of the solvent 340 g of tosyl derivative, which appears as a limpid liquid, are obtained, characterized by IR, $^{19}F$ NMR and H NMR.

In a jacketed more necked reactor, equipped with thermocouple, mechanical stirrer and condenser, containing 18 g (0.16 moles) of potassiumterbutylate and 194 g (1 mole) of tetraethylenglycol, 122 g (0.15 moles) of the above prepared tosyl derivative are dropped at the temperature of 60° C. in 4 hours. Then it is acidified with diluted hydrochloric acid and the organic phase is separated. After a second washing with 200 ml of hydrochloric acid at 5% the organic phase is dried and 117 g of $Cl(C_3F_6O)_{2.8}(C_2F_4O)_{0.25}(CF_2O)_{0.06}CF_2CH_2$—$OCH_2$—$CH_2(OCH_2CH_2)_4OH$ are recovered.

The compound is characterized by IR, $^{19}F$ NMR and H NMR. The value of K is 2.32.

A composition is prepared formed by $CF_3O(C_3F_6O)_{1.7}(CF_2O)_{0.1}CF_3$ and containing 300 ppm of the additive prepared as above. The value $K^I$ is 1.31.

In the test of removal of the water drop the same result is obtained as with the compositions of the previous comparative Examples.

EXAMPLE 6

Synthesis of the additive of formula $Cl(C_3F_6O)_{4.65}(C_2F_4O)_{0.45}(CF_2O)_{0.1}CF_2CH_2OCH_2CH_2(OCH_2CH_2)_4OH$, and preparation of the composition with the component B) of Example 2 and corresponding evaluation with the removal test of the water drop In a jacketed more necked reactor, equipped with thermocouple, mechanical stirrer and condenser, containing 160 g of aqueous NaOH solution at 50% and 95 g (0.5 moles) of paratoluensulphonic acid chloride dissolved in 400 ml of $CH_2Cl_2$, 445 g of the following compound:

$Cl(C_3F_6O)_{4.65}(C_2F_4O)_{0.45}(CF_2O)_{0.1}CF_2CH_2OCH_2CH_2OH$ corresponding to 0.45 moles are dropped.

The solution is left at room temperature for eight hours under strong stirring. 1 liter of water is added and it is left under stirring for further 4 hours.

It is neutralized with hydrochloric acid and the organic phase is separated. After distillation of the solvent, 475 g of tosyl derivative, which appears as a limpid liquid, characterized by IR, $^{19}F$ NMR and H NMR, are obtained.

In a jacketed more necked reactor, equipped with thermocouple, mechanical stirrer and condenser, containing 18 g (0.16 moles) of potassiumterbutylate and 194 g (1 mole) of tetraethylenglycol, 172 g (0.15 moles) of the above prepared tosyl derivative are dropped at 60° C. in 4 hours. Then it is acidified with diluted hydrochloric acid and the organic phase is separated. After a second washing with 200 ml of hydrochloric acid at 5% the organic phase is dried and 166 g of $Cl(C_3F_6O)_{4.65}(C_2F_4O)_{0.45}(CF_2O)_{0.1}CF_2CH_2OCH_2CH_2(OCH_2CH_2)_4OH$ are recovered.

The compound is characterized by IR, $^{19}F$ NMR and H NMR. The value of K is 3.7.

A composition is prepared formed as component B) by $CF_3O(C_3F_6O)_{1.7}(CF_2O)_{0.1}CF_3$ containing 300 ppm of the above prepared additive. The value $K^I$ is 2.

The composition evaluated by the above described test proves to be able to completely remove the water drop (point: 1).

EXAMPLE 7

Synthesis of the additive of formula $Cl(C_3F_6O)_{3.2}(C_2F_4O)_{0.8}(CF_2O)_{0.1}CF_2CH_2OCH_2CH_2(OCH_2CH_2)_4OMe$, preparation of the composition with the perfluoropolyether component B) of Example 1 and respective evaluation with the removal test of the water drop.

In a jacketed more necked reactor, equipped with thermocouple, mechanical stirrer and condenser, containing 50 g (0.05 moles) of $Cl(C_3F_6O)_{3.2}(C_2F_4O)_{0.8}(CF_2O)_{0.1}CF_2CH_2OCH_2CH_2(OCH_2CH_2)_4OH$, 6.7 g (0.06 moles) of potassium terbutylate are added and it is left under strong stirring until complete reaction of the solid. Then the developed terbutyl alcohol is removed by distillation, 11.4 g (0.08 moles) of methyl iodide are dropped and it is left under stirring for 3 hours.

350 ml of water are added, the phases are separated and the dried organic phase is formed by 49 g of $Cl(C_3F_6O)_{3.7}(C_2F_4O)_{0.37}(CF_2O)_{0.1}CF_2CH_2OCH_2CH_2(OCH_2CH_2)_4OMe$ The compound is characterized by IR, $^{19}F$ NMR and H NMR. The K value is 2.8.

A composition is prepared, formed by $CF_3O(C_3F_6O)_1(CF_2O)_{0.1}CF_3$ containing 300 ppm of the above prepared additive. The $K^I$ value is 2.3.

The composition evaluated in the above described test proves to be able to completely remove the water drop (point: 1).

EXAMPLE 8

Preparation of a composition containing the additive of the comparative Example 5 with the perfluoropolyether component B) of Example 1, and respective evaluation with the removal test of the water drop.

A composition is prepared wherein component B) is the perfluoropolyether $CF_3O(C_3F_6O)_1(CF_2O)_{0.1}CF_3$, containing 300 ppm of the non ionic fluorinated surfactant: $Cl(C_3F_6O)_{2.8}(C_2F_4O)_{0.25}(CF_2O)_{0.06}CF_2CH_2OCH_2CH_2(OCH_2CH_2)_4OH$ The value $K^I$ is 1.78.

In the test of the removal of the water drop point 2 is attributed to the composition.

EXAMPLE 9 (COMPARATIVE)

Example 8 of EP 826,714 was repeated wherein the additive has a perfluorinated end group $T=CF_3$, $K^I=1.12$, $K=2.2$.

In the test of the removal of the water drop point 1 is attributed to the composition.

From the comparison between the comparative Example 9 and the comparative Examples 3, 4 and 5 wherein an additive having an end group containing one chlorine atom is used, it is noticed that by operating with $K^I$ values lower than the limits of the present invention with the fluorinated end group the complete removal of water from the substratum is obtained, while by operating with an additive having one chlorine atom in the end group, the composition results ineffective in the removal of water from the substratum.

What is claimed is:

1. A method for removing water from surfaces of substrata, comprising the steps of covering said surface with a composition having a specific weight higher than that of the water and subsequently removing water from the composition by skimming, wherein a composition essentially consisting of the following components is used:

A) a non ionic additive having a fluoropolyether structure with a fluorinated T end group containing one chlorine atom, having the following formula:

$$T-OR_f(CFY)-L \qquad (I)$$

wherein $$L=X-CH_2CH_2(OCH_2CH_2)_nB \qquad (Ia)$$

wherein:
$X=CH_2O$; $CH_2NR''$; $CONR''$; $CH_2OCH_2CH_2NR''$; $CH_2OCOCH_2O$;
$B=OH$; $SH$; $NHR''$; $OCH_3$; $OCOCH_3$, with $R''=H$; $C_{1-3}$ alkyl, T is a fluorinated radical selected from $ClCF_2CF(CF_3)-$, $CF_3CFClCF_2-$, $ClCF_2CF_2-$, $ClCF_2-$,
$Y=CF_3$ or F, $R_f$ is a perfluoropolyether or fluoropolyether radical;
the number average molecular weight of the fluoroether part $T-OR_f-$ in the range 400–2,000,
a ratio by weight (K) between the fluorinated part and an L part of the additive is in the range 1.50–4.00; n in formula (Ia) is such as the ratio (K) is in the range 1.50–4.00;

B) a perfluoropolyether having number average molecular weight in the range 300–900, provided that a ratio ($K^I$) between the number average molecular weight of the fluoropolyether part $T-OR_f-$ of the additive A) and the number average molecular weight of component B) is higher than 1.60.

2. A method according to claim 1, wherein the number average molecular weight of the fluoroether part $T-OR_f-$ of the compounds of formula (I) component A) is in the range 500–1,200.

3. A method according to claim 1, wherein the perfluoropolyether component B) has number average molecular weight in the range of 300–650.

4. A method according to claim 1, wherein the radical $R_f$ comprises repeating units statistically distributed along the polymer chain selected from: 1) ($CF_2CF_2O$), 2) (CFYO) wherein Y is equal to F or $CF_3$, 3) ($C_3F_6O$); 4) ($CF_2(CF_2)_zO$) wherein z is an integer equal to 2 or 3; 5) ($CF_2CF(OR_f)O$) or ($CF(OR_f)O$) wherein $R_f$ is equal to —$CF_3$, —$C_2F_5$, —$C_3F_7$; 6) $CR_4R_5CF_2CF_2O$ wherein $R_4$ and $R_5$ are equal to or different from each other and selected between Cl or perfluoroalkyl having 1–4 carbon atoms.

5. A method according to claim 4, wherein the group $R_f$ comprises the following repeating units:

(a) —($CF_2CF(CF_3)O$)$_a$(CFYO)$_b$—
wherein Y is F or $CF_3$; a and b are integers such that the molecular weight of T-OR$_f$— is in the range 400–2,000; a/b is in the range 10–100;

(b) —($CF_2CF_2O$)$_c$($CF_2O$)$_d$($CF_2(CF_2)_zO_h$)—
wherein c, d and h are integers such that the molecular weight of T-OR$_f$ is within the range 400–2,000; c/d is in the range 0.1–10; h/(c+d) is in the range 0–0.5, z=2 or 3, h can be equal to 0;

(c) —($CF_2CF(CF_3)O$)$_e$($CF_2CF_2O$)$_f$(CFYO)$_g$—
wherein Y is F or $CF_3$; e, f, g are integers such that the molecular weight of T-OR$_f$ is within the range 400–2,000; e/(f+g) is in the range 0.1–10, f/g is in the range 2–10;

(d) —($CF_2O$)$_j$($CF_2CF(OR_{f''})O$)$_k$($CF(Or_{f''})O$)$_{l'}$—
wherein: $R_f$ is —$CF_3$, —$C_2C_5$, —$C_3F_7$; j, k, l are integers such that the molecular weight of T-OR$_f$ is within the range 400–2,000; k+l and j+k+l are at least equal to 2, k/(j+l) is in the range 0.01–1,000, l/j is in the range 0.01–100;

(e) —($CF_2(CF_2)_zO$)$_s$—
wherein s is an integer such as to give the molecular weight of T-OR$_f$ in the range 400–2,000, z=2 or 3;

(f) —($CR_4R_5CF_2CF_2O$)$_{j'}$—
wherein $R_4$ and $R_5$ are equal to or different from each other and selected from H, Cl or perfluoroalkyl, having 1–4 carbon atoms, j' being an integer such that the molecular weight of T-OR$_f$ is in the range 400–2,000;

(g) —($CF(CF_3)CF_2O$)$_{j''}$—
j" being an integer such to give the molecular weight of T-OR$_f$ in the range 400–2,000.

6. A method according to claim 1, wherein the value $K^I$ is higher than 2.00.

7. A method according to claim 1, wherein the perfluoropolyether component B) has the following structure:

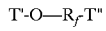

wherein:
$R_f$ is the perfluoropolyether radical according to claim 1;
T' and T", equal to or different, are selected from —$CF_3$, —$C_2F_5$, —$C_3F_7$.

8. A method according to claim 7, wherein the perfluoropolyether component B) has a structure selected from the following:

$$T'O(C_3F_6O)_{a''}(CFYO)_{b''}T'' \qquad (III)$$

wherein Y=F or $CF_3$, a" and b" are integers such that the molecular weight of B) is within the range 300–900 with a"/b" in the range 1–40; T' and T" are as above defined;

$$T'O(C_2F_4O)_p(CF_2O)_qT'' \qquad (IV)$$

wherein p and q are integers such that the molecular weight of B) is within the range 300–900 with p/q in the range 0.6–1.2; T' and T" are as above defined;

$$T'O(C_3F_6O)_{s'}T'' \qquad (V)$$

wherein s' is an integer such that the molecular weight of B) is within the range 300–900; T" and T' are as above defined.

9. A method according to claim 1, wherein the amount of additive A) in the compositions is lower than or equal to 0.1% by weight, with respect to the total weight of the composition.

10. A composition consisting essentially of component A) and component B) according to claim 1.

11. A method according to claim 2, wherein the number average molecular weight of the fluoroether part T-OR$_f$— of the compounds of formula (I) component A) is in the range 600–1,000.

12. A method according to claim 6, wherein the value $K^I$ is in the range 2.00–3.00.

13. A method according to claim 9, wherein the amount of additive A) in the compositions is lower than 0.05% by weight, with respect to the total weight of the composition.

* * * * *